Patented Aug. 13, 1935

2,011,131

UNITED STATES PATENT OFFICE 2,011,131

METHOD AND MEANS FOR PREVENTING SOIL EROSION BY WINDSTORMS

Mark S. Willing, Mount Holly, Va.

No Drawing. Application May 9, 1935, Serial No. 20,686

8 Claims. (Cl. 47—58)

One of the outstanding national problems of the present time is the elimination or prevention of soil erosion, which is being caused by wind storms in the western sections of the country. Thousands of acres of valuable lands, with a value running into the millions of dollars, have been, and will continue to be, devastated by such wind storms if means are not evolved to prevent such action. By the same token, in other portions of the country, lands are being rendered useless and practically valueless by the soil deposited thereon from the eroded areas. In addition, the "dust storms" caused by the removal of soil from the devastated portions of the country by the wind, cause great damage in various lines of industry.

With these facts in mind, the object of the present invention is to provide a method of preventing soil erosion by wind storms.

It is a matter of common knowledge the lands well covered with vegetation are not susceptible to the destructive action of the wind. For instance, in the case of well covered grass lands, the blades of grass serve not only to break up, so to speak, the blasts of air, but when flexed and bent down by the wind, they more closely cover the soil with the result that the soil cannot be removed by the wind.

Consequently, the invention specifically contemplated in the present instance consists of a method wherein the area to be protected is first seeded, say with grass, and the seeded area then covered with a material having interstices through which the grass, when it sprouts, may project, the strands of said material being provided with numerous, upwardly extending, flexible elements which might be compared, in function, to blades of grown grass. In other words, said flexible elements will protect the soil of the seeded area against the destructive effects of wind storms until the seed has developed into vegetation of sufficient height to give permanent protection to the soil. The covering may then be removed and used on another seeded area, if desired.

In the preferred method, a comparatively fine wire mesh material is used in covering the seeded area. The strands of such material carry the upwardly extending flexible elements which, for economy in manufacturing costs, may take the form of small strips of tin, as they can be produced from scrap material salvaged from tin receptacle factories. The size of the mesh in the covering, and the spacing of the flexible elements carried thereby may, of course, be varied. However, it will be appreciated that the smaller the mesh, and the closer together the elements are arranged on the covering, the greater protection will be. It is possible, however, to use a mesh material such as that commonly termed "chicken wire" without departing from the spirit of the invention. For instance, where the so-called "chicken wire" is used, the protective flexible elements extending upwardly therefrom will interrupt or break up the blasts of air, so that the latter cannot impinge against the soil with the same force and destructive effect as they would if not interrupted or given a clean sweep across the protected seeded area. Furthermore, while the openings in the chicken wire are quite large, nevertheless the protective elements, when flexed by the wind, will bend down and, even though they may not actually contact the surface of the soil, they will more completely cover that surface and protect it against the wind.

No particular form of fastening means are required for securing the flexible protective elements to the mesh covering. A suitable form of cement or solder may be used. A cement might be preferable, as it may facilitate production in that the materials may be run through a bath for the purpose of applying the cement thereto. Again, the protective elements might be secured on the mesh material mechanically, as by bending or twisting them around the strands of the mesh material.

The practice of the present method may be briefly described as follows. Any given area of land to be protected is first prepared for sowing and then seeded with, say, grass. The seeded area is then covered with the mesh material having the upwardly extending flexible protective elements thereon. The weight of this protective covering is such that it cannot be disturbed or accidentally displaced by wind and remains in place until the grass has grown to a point where it affords an ample, protective covering for the area under treatment. The mesh material, carrying the protective elements may then be removed and used again, as desired. To facilitate placement and removal of the wire mesh, it is preferably formed in rather long lengths which can be stored on reels from which it can be wound when being laid on the soil and onto which it can be wound when removed from the area under treatment.

What I claim is:

1. The method of preventing soil erosion by wind storms which consists in seeding the area to be protected and securing on said seeded area means in the form of an artificial grass for preventing removal of the seeded soil by blasts of air.

2. The method of preventing soil erosion by wind storms which consists in seeding the area to be protected, and placing over said seeded area means for effecting a breaking up of air blasts whereby the latter, as such, cannot impinge against the seeded area.

3. The method of preventing soil erosion by wind storms which consists in seeding the area to be protected, placing over said seeded area a covering of meshed material having flexible elements extending upwardly therefrom to break up blasts of air impinging against the same.

4. The method of preventing soil erosion by wind storms which consists in seeding the area to be protected and placing over said seeded area a wire mesh material having secured on the strands thereof upwardly extending metal elements adapted to flex under blasts of air impinging thereon, said elements breaking up said air blasts and more closely covering said seeded area when flexed by said air blasts.

5. In a device for preventing soil erosion by wind storms, the combination of a body of mesh material having interstices therein through which growing blades of grass may project themselves, and a plurality of flexible, protective elements carried by the strands of said mesh material and adapted to protect soil exposed through said interstices when said mesh material is placed over a seeded area of soil.

6. The method of preventing soil erosion by wind storms which consists in seeding the area to be protected, and placing over said seeded area a multiplicity of lengths of material having flexible elements extending upwardly therefrom to break up blasts of air impinging against the same.

7. The method of preventing soil erosion by wind storms which consists in seeding a portion of the area to be protected, and placing over said seeded area a plurality of lengths of wire each carrying a plurality of upwardly extending metal elements adapted to flex under blasts of air impinging thereon, said elements breaking up said air blasts and more closely covering said seeded area when flexed by said air blasts.

8. In a device for preventing soil erosion by wind storms, the combination of a plurality of lengths of wire adapted to be placed over a seeded area of soil in spaced relation whereby growing blades of grass may project themselves through between juxtaposed wires, and a plurality of flexible, protective elements carried by said lengths of wire and adapted to protect soil exposed between contiguous lengths of wire.

MARK S. WILLING.